(12) United States Patent
Ding et al.

(10) Patent No.: US 11,823,669 B2
(45) Date of Patent: Nov. 21, 2023

(54) INFORMATION PROCESSING APPARATUS AND INFORMATION PROCESSING METHOD

(71) Applicant: KABUSHIKI KAISHA TOSHIBA, Minato-ku (JP)

(72) Inventors: Ning Ding, Yokohama (JP); Hiroshi Fujimura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/804,346

(22) Filed: Feb. 28, 2020

(65) Prior Publication Data

US 2021/0056961 A1    Feb. 25, 2021

(30) Foreign Application Priority Data

Aug. 23, 2019    (JP) .................................. 2019-153039

(51) Int. Cl.
*G10L 15/20*    (2006.01)
*G10L 15/02*    (2006.01)
(Continued)

(52) U.S. Cl.
CPC .............. *G10L 15/20* (2013.01); *G10L 15/02* (2013.01); *G10L 15/142* (2013.01); *G10L 15/22* (2013.01);
(Continued)

(58) Field of Classification Search
CPC ......... G10L 15/20; G10L 15/02; G10L 25/84; G10L 15/142; G10L 15/30; G10L 15/22;
(Continued)

(56) References Cited

U.S. PATENT DOCUMENTS 5,950,159 A * 9/1999 Knill ....................... G10L 15/26
  704/E15.005
6,985,859 B2 * 1/2006 Morin ..................... G10L 15/20
  704/254
(Continued)

FOREIGN PATENT DOCUMENTS

CN    109461456 A  *  3/2019 ............. G10L 15/22
JP    2003-202887 A    7/2003
(Continued)

OTHER PUBLICATIONS

Wu, Minhua, et al. "Monophone-Based Background Modeling for Two-Stage On-Device Wake Word Detection." (cited in IDS) (Year: 2018).*
(Continued)

*Primary Examiner* — Bhavesh M Mehta
*Assistant Examiner* — Nandini Subramani
(74) *Attorney, Agent, or Firm* — Oblon, McClelland, Maier & Neustadt, L.L.P.

(57) ABSTRACT

According to one embodiment, an information processing apparatus include following units. The first acquisition unit acquires speech data including frames. The second acquisition unit acquires a model trained to, upon input of a feature amount extracted from the speech data, output information indicative of likelihood of each of a plurality of classes including a component of a keyword and a component of background noise. The first calculation unit calculates a keyword score indicative of occurrence probability of the component of the keyword. The second calculation unit calculates a background noise score indicative of occurrence probability of the component of the background noise. The determination unit determines whether or not the speech data includes the keyword.

13 Claims, 10 Drawing Sheets

(51) Int. Cl.
    *G10L 25/84*     (2013.01)
    *G10L 15/14*     (2006.01)
    *G10L 15/30*     (2013.01)
    *G10L 15/22*     (2006.01)
    *G10L 15/08*     (2006.01)

(52) U.S. Cl.
    CPC .............. G10L 15/30 (2013.01); G10L 25/84 (2013.01); *G10L 2015/025* (2013.01); *G10L 2015/088* (2013.01)

(58) Field of Classification Search
    CPC ......... G10L 2015/025; G10L 2015/088; G10L 15/16; G10L 15/10; G10L 15/26; G10L 25/51
    See application file for complete search history.

(56) References Cited

U.S. PATENT DOCUMENTS

| | | | | |
|---|---|---|---|---|
| 8,131,543 | B1* | 3/2012 | Weiss | G10L 25/78 704/226 |
| 10,964,311 | B2* | 3/2021 | Fujimura | G10L 15/05 |
| 10,964,315 | B1* | 3/2021 | Wu | G10L 15/16 |
| 11,037,556 | B2* | 6/2021 | Rangarajan | G10L 15/22 |
| 2003/0125943 | A1* | 7/2003 | Koshiba | G10L 15/20 704/238 |
| 2003/0200086 | A1* | 10/2003 | Kawazoe | G10L 15/20 704/239 |
| 2007/0136058 | A1* | 6/2007 | Jeong | G10L 15/08 704/240 |
| 2016/0071516 | A1* | 3/2016 | Lee | G10L 15/30 704/251 |
| 2017/0148429 | A1* | 5/2017 | Hayakawa | G10L 15/02 |
| 2017/0256255 | A1* | 9/2017 | Bocklet | G10L 17/22 |
| 2017/0256270 | A1* | 9/2017 | Singaraju | G10L 25/21 |
| 2018/0040325 | A1* | 2/2018 | Melanson | G10L 17/02 |
| 2018/0268809 | A1 | 9/2018 | Fujimura | |
| 2019/0180734 | A1* | 6/2019 | Liu | G10L 25/78 |
| 2020/0357386 | A1* | 11/2020 | Gao | G10L 15/08 |

FOREIGN PATENT DOCUMENTS

| | | | |
|---|---|---|---|
| JP | 2005-092310 A | | 4/2005 |
| JP | 2013-117729 A | | 6/2013 |
| JP | 2016-515741 A | | 5/2016 |
| JP | 2018-155957 A | | 10/2018 |
| KR | 20060082465 A | * | 7/2006 |

OTHER PUBLICATIONS

Wu et al., "Monophone-Based Background Modeling for Two-Stage On-Device Wake Word Detection", IEEE International Conference on Acoustics, Speech and Signal Processing (ICASSP), Apr. 2018, pp. 5494-5498.

* cited by examiner

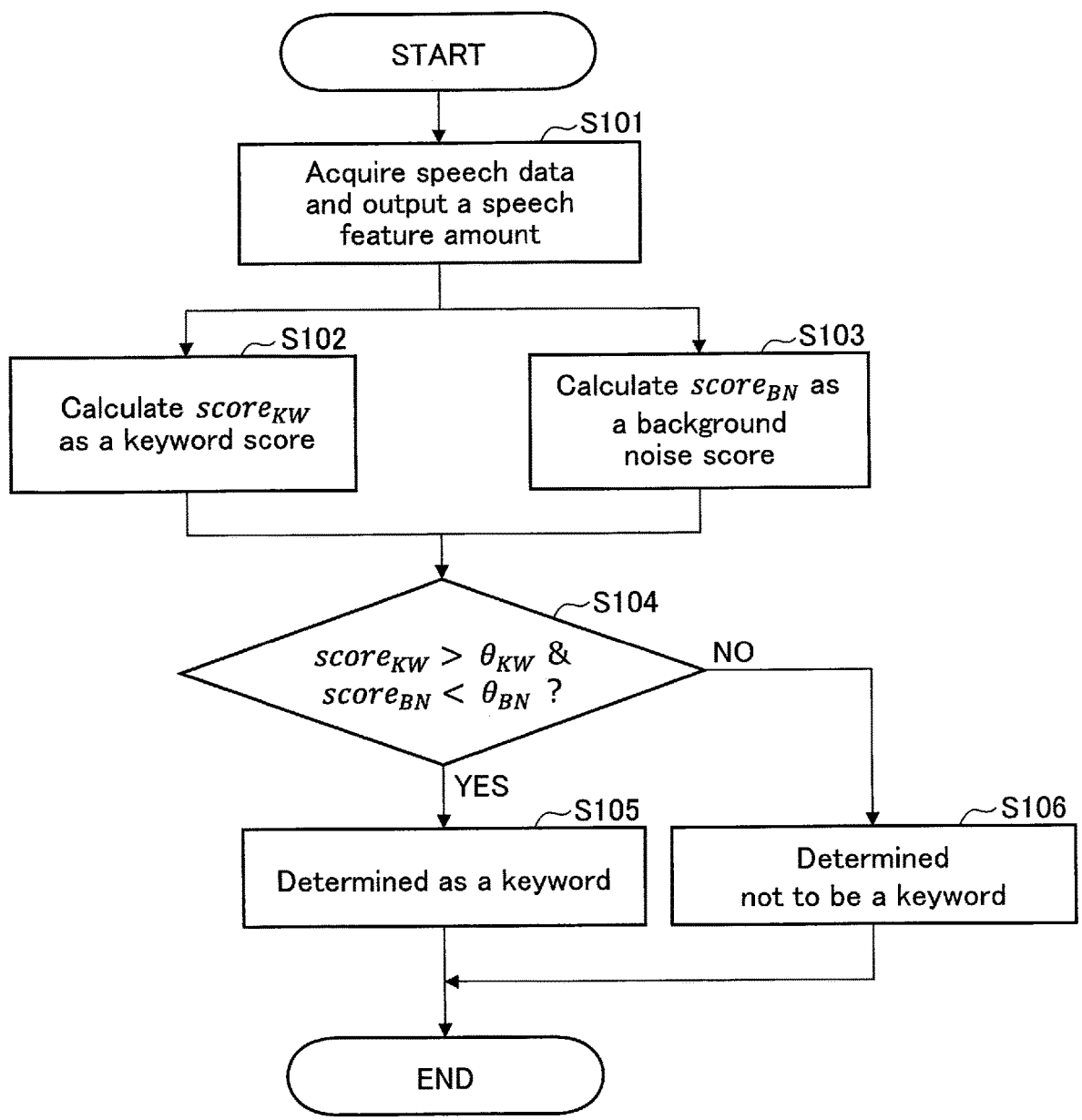
F I G. 4

INFORMATION PROCESSING APPARATUS AND INFORMATION PROCESSING METHOD

CROSS-REFERENCE TO RELATED APPLICATIONS

This application is based upon and claims the benefit of priority from Japanese Patent Application No. 2019-153039, filed Aug. 23, 2019, the entire contents of which are incorporated herein by reference.

FIELD

Embodiments described herein relate generally to an information processing apparatus and an information processing method.

BACKGROUND

In recent years, smart speakers applied to speech operations have rapidly grown in popularly. A smart speaker is activated by, for example, detection of a specific keyword called a "wake word" from speech. A user may activate the smart speaker and continue various operations only by vocalizing the keyword. Thus, a technique for detecting a keyword from speech with a high degree of accuracy is necessary.

BRIEF DESCRIPTION OF THE DRAWINGS

FIG. 4 is a flow chart showing an example of a processing procedure and processing performed by the information processing apparatus according to the first embodiment.

DETAILED DESCRIPTION

Hereinafter, various embodiments will be described with reference to the accompanying drawings.

An object of the embodiments is to provide an information processing apparatus, an information processing method, and program that can precisely detect a keyword from a speech.

According to one embodiment, an information processing apparatus include a first acquisition unit, a second acquisition unit, a first calculation unit, a second calculation unit, and a determination unit. The first acquisition unit acquires speech data including a plurality of frames. The second acquisition unit acquires a model trained to, upon input of a feature amount extracted from the speech data, output information indicative of likelihood of each of a plurality of classes including a component of a specific keyword and a component of background noise other than the keyword. The first calculation unit calculates a keyword score indicative of occurrence probability of the component of the keyword, based on the information output from the model, by extracting the feature amount for each of the frames of the speech data and inputting the feature amount to the model. The second calculation unit calculates a background noise score indicative of occurrence probability of the component of the background noise, based on the information output from the model, by extracting the feature amount for each of the frames of the speech data and inputting the feature amount to the model. The determination unit determines whether or not the speech data includes the keyword based on the keyword score, the background noise score, and a threshold.

First Embodiment (1) Speech Keyword Detection System

Figure 1:
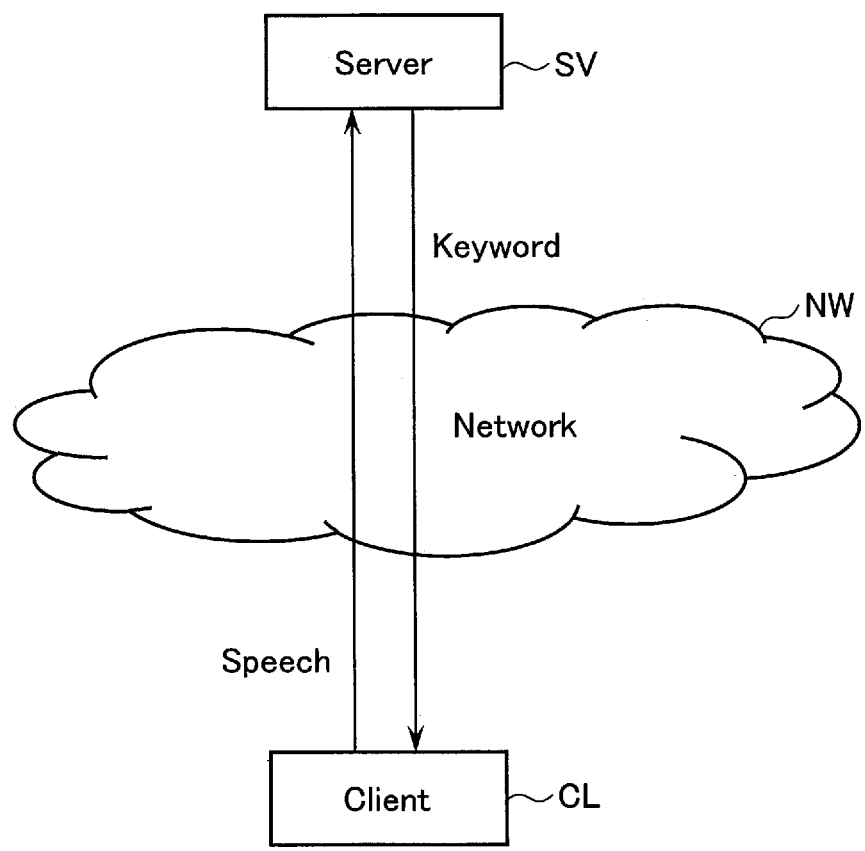
FIG. 1 is a diagram showing an example of an overall configuration of a system including an information processing apparatus according to a first embodiment.

FIG. 1 is a diagram showing an example of an overall configuration of a speech keyword detection system including an information processing apparatus according to a first embodiment.

This system includes a server SV and a client CL capable of communicating each other via a network NW.

The network NW is constituted by, for example, an IP (Internet Protocol) network represented by the Internet and a plurality of access networks for accessing the IP network. As the access networks, for example, a wireless LAN (Local Area Network), a mobile telephone network, a wired telephone network, FTTH (Fiber To The Home), or a CATV (Cable Television) network may be used.

The server SV is implemented as a server computer, for example. The client CL is implemented as a built-in system embedded in various electronic devices or mobile information terminals such as a personal computer, a tablet computer, a smartphone, a mobile telephone, and a PDA. At least one of the server SV or the client CL has a speech keyword detection function for detecting a keyword from speech. FIG. 1 only shows one server SV and one client CL for simplicity; however, a given number of servers SV and a given number of clients CL may be connected.

In the system shown in FIG. 1, the client CL includes a microphone, etc. for converting speech into a speech signal (speech data). Upon receiving the speech, the client CL generates speech data by using the microphone, etc., and transmits the speech data to the server SV via the network NW. The server SV has a function to detect a keyword from the speech data. Upon receiving the speech data from the client CL, the server SV extracts a keyword from the speech data, and transmits the extracted keyword to the client CL. The client CL that has received the detected keyword can commence a specific operation in accordance with the keyword. The client CL may transmit a feature amount extracted from the speech data, instead of the speech data, to the server SV. The server SV can detect the keyword from the received speech feature amount, and transmit the keyword to the client CL.

The client CL may have the speech keyword detection function. In this case, the client CL can detect a keyword from the generated speech data.

As described above, in the above system, at least one of the client CL or the server SV has the speech keyword detection function, which enables the detection of a keyword from the speech data.

For simplicity of explanation, the client CL having the speech keyword detection function is described as an information processing apparatus according to the embodiment, and is called a "speech keyword detection apparatus."

(2) Speech Keyword Detection Apparatus

Figure 2:
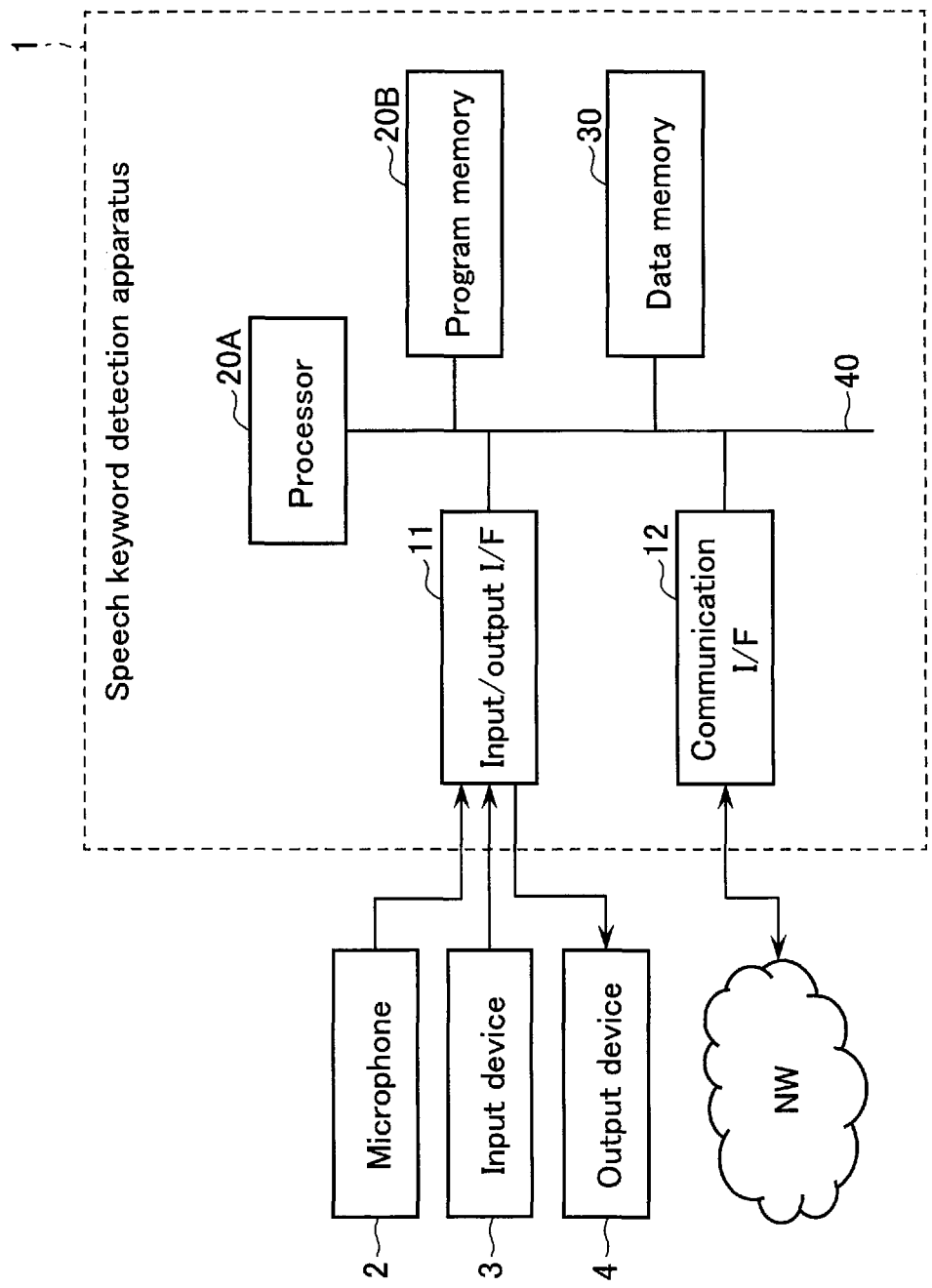
FIG. 2 is a block diagram showing an example of a system configuration of the information processing apparatus according to the first embodiment.

FIG. 2 is a block diagram showing an example of a system configuration of a speech keyword detection apparatus 1 as an information processing apparatus according to the first embodiment.

The speech keyword detection apparatus 1 has a hardware processor 20A such as a CPU (Central Processing Unit), for example. A program memory 20B, a data memory 30, an input/output interface (input/output I/F) 11, and a communication interface (communication I/F) 12 are connected to the hardware processor via a bus 40.

A microphone 2, an input device 3, and an output device 4, which are attached to the speech keyword detection apparatus 1, are connected to the input/output interface 11. The input/output interface 11 takes in speech collected with the microphone 2. The input/output interface 11 also takes in operation data input by the operator through the input device 3 such as a keyboard, a touch panel, a touch-pad, and a mouse. The input/output interface 11 performs the processing to output the output data to the output device 4, including a display device using liquid crystal or organic EL (Electro Luminescence), etc. and a speaker for outputting a speech, so as to display the output data. Devices embedded in the speech keyword detection apparatus 1 may be used as the microphone 2, the input device 3, and the output device 4. Also, a microphone, an input device, and an output device of another information terminal capable of communicating through the network may be used as the microphone 2, the input device 3, and the output device 4.

The communication interface 12 includes one or more wired or wireless communication interface units, for example, which enable transmission and reception of information between the communication interface 12 and external devices. As a wired interface, a wired LAN is used, for example. As a wireless interface, an interface, which adopts a wireless LAN and a low electric power wireless data communication standard such as Bluetooth (registered trademark), is used, for example.

In the program memory 20B as a storage medium, for example, a non-volatile memory capable of writing and reading as needed, such as an HDD (Hard Disk Drive) and an SSD (Solid State Drive), is combined with a non-volatile memory such as a ROM. The program memory 20B stores a program necessary for performing various control processing according to an embodiment.

In the data memory 30 as a storage medium, for example, a non-volatile memory capable of writing and reading as needed, such as HDD (Hard Disk Drive) and SSD (Solid State Drive), is combined with a non-volatile memory such as a RAM (Random Access Memory). The data memory 30 is used for storing various data acquired and generated in the process of performing information processing.

An apparatus having the speech keyword detection function can calculate a keyword score relative to a feature amount of an input speech when obtaining speech data, and determine the speech as a keyword if the score is equal to or greater than the threshold, for example. However, in this case, the possibility of the feature amount being derived from background noise is not determined; thus, even background noise may be detected as a keyword if the score is equal to or more than the threshold.

In the present embodiment, not only the score of a keyword but also the score of background noise is calculated, and whether it is a keyword or not is determined by using the calculated score of the keyword and the calculated score of the background noise. Thereby, a false detection of a keyword can be reduced.

Figure 3:
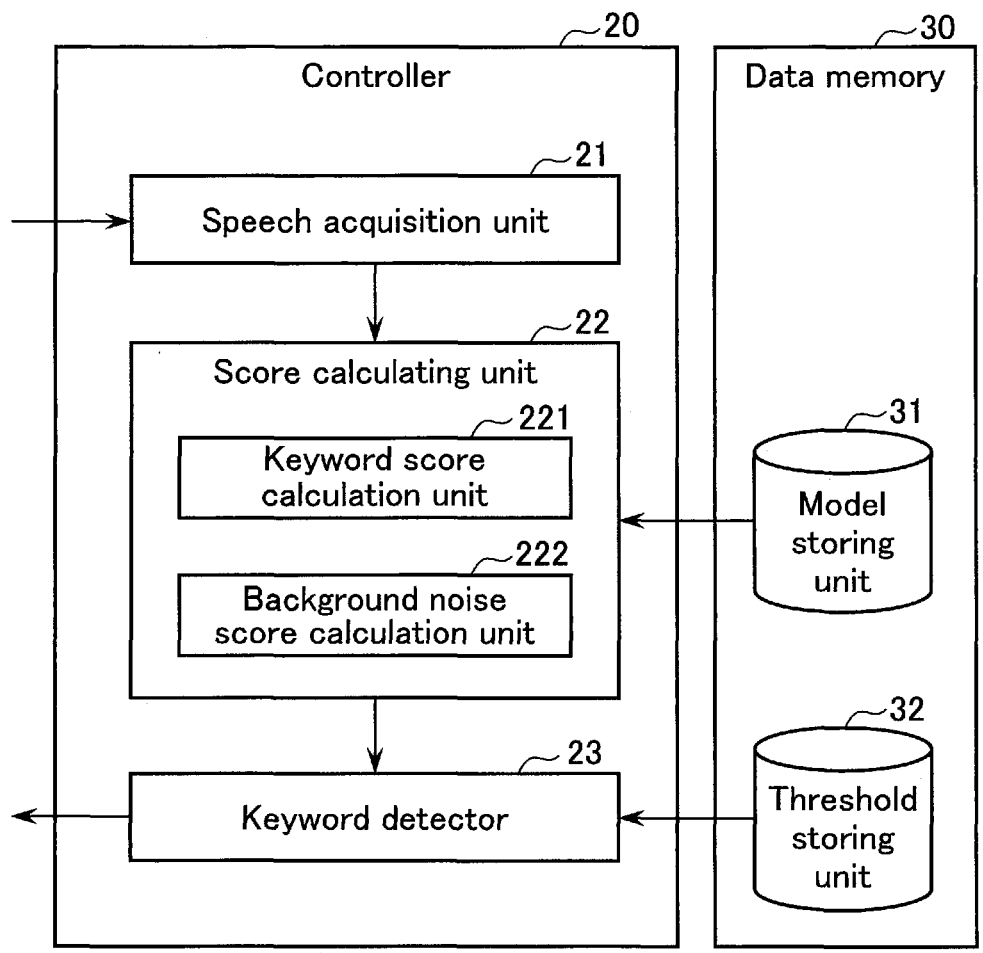
FIG. 3 is a block diagram showing an example of a functional configuration of the information processing apparatus according to the first embodiment.

FIG. 3 is a block diagram showing the functional configuration of the speech keyword detection apparatus 1 according to the first embodiment.

In a storage area of the data memory 30, a model storing unit 31 and a threshold storing unit 32 are provided.

The model storing unit 31 stores a model including a component of a keyword and a component of a background noise. In the present embodiment, the model stored in the model storing unit 31 is trained, upon the input of a feature amount extracted from the speech data, to output information indicative of the likelihood of each of a plurality of classes, including a specific keyword component and a component of background noise other than the keyword. The model may be in a GMM (Gaussian Mixture Model) format, or a DNN (Deep Neural Network) format. If a plurality of keywords are preset, a plurality of models respectively corresponding to the keywords may be stored.

Herein, the background noise is a collective term for noise emitted from the environment, and includes both speech and non-speech. For example, if the environment is a conference room, the background noise includes noise emitted from an operating air conditioner and speech leaking out from an adjacent conference room. If the environment is the inside of a car, the background noise includes the sound of a car engine and music from a car audio.

Herein, the component of the keyword indicates a given structural unit included in a speech in which a keyword is spoken. As an example, in the description below, a component of a keyword is considered as a phoneme. Herein, the component of background noise indicates a given structural unit included in preset background noise. In the description below, a component of background noise is called "phoneme of background noise" in a pseudo manner.

The threshold storing unit 32 stores various preset thresholds to be used in speech keyword detection processing.

The controller 20 is constituted by the hardware processor 20A and the program memory 20B, and includes a speech acquisition unit 21, a score calculation unit 22, and a keyword detector 23, as processing function parts. All of these processing function parts are implemented by causing the hardware processor 20A to execute a program stored in the program memory 20B. The controller 20 may be implemented in other various formats including an integrated circuit such as ASIC (Application Specific Integrated Circuit) and FPGA (field-programmable gate array). The above program may be provided through the network.

The speech acquisition unit 21, as a first acquisition unit, performs the processing of acquiring speech data including a plurality of frames. The speech acquisition unit 21, for example, receives a speech waveform collected through the microphone 2, digitizes the speech waveform, extracts a speech feature amount for each frame, and outputs the speech feature amount to the score calculation unit 22. Herein, the speech feature amount may be MFCC (Mel Frequency Cepstral Coefficient), and may be a Mel filter bank. Alternatively, a pitch feature amount, a Δ component or a ΔΔ component of the pitch feature amount, or a combination of the feature amounts may be used.

The score calculation unit 22 passes the speech feature amount received from the speech acquisition unit 21 to the keyword score calculation unit 221 and the background noise score calculation unit 222. The score calculation unit 22, as a second acquisition unit, reads the trained model stored in the model storing unit 31, and passes the read model to the keyword score calculation unit 221 and the background noise score calculation unit 222 for score calculation.

The keyword score calculation unit 221, as a first calculation unit, calculates a keyword score by matching each frame of the speech data with a component of a keyword of the model. In the present embodiment, the keyword score calculation unit 221 extracts the feature amount from the speech data for each frame of the speech data, and calculates a keyword score based on output obtained by inputting the feature amount to the model. The keyword score is information indicating the probability of the occurrence of a preset component of a keyword in the speech data.

The background noise score calculation unit 222, as a second calculation unit, calculates a background noise score by matching each frame of the speech data with a background noise component of the model. In the present embodiment, the background noise score calculation unit 222 extracts the feature amount from the speech data for each frame of the speech data, and calculates a background noise score based on output obtained by inputting the feature amount to the model. The background noise score is information indicating the occurrence probability of a preset component of background noise in the speech data.

The keyword detector 23, as a determination unit, determines whether or not the speech data includes the keyword based on the keyword score calculated by the keyword score calculation unit 221, the background noise score calculated by the background noise score calculation unit 222, and the preset threshold stored in the threshold storing unit 32. Determination operation by the keyword detector 23 will be described in detail later. The keyword detector 23 can also output a determination result. For example, if the speech data is determined to include a keyword, the keyword detector 23 may output the keyword.

Next, information processing operation by the speech keyword detection apparatus 1 accordingly configured will be described. FIG. 4 is a flow chart showing an example of a process procedure related to calculation of reliability.

In one embodiment, the speech keyword detection apparatus 1 commences this processing when the speech data collected with the microphone 2 is input via the input/output interface 11.

Acquisition of speech data and output of speech feature amount

First, in step S101, the speech keyword detection apparatus 1 acquires speech data, and extracts and outputs a speech feature amount, under control of the speech acquisition unit 21.

The speech acquisition unit 21, for example, samples an analog spectrum of a speech waveform at 16 kHz, and indicates an amplitude value of one sample of a digital spectrum in 16 bits. The speech acquisition unit 21 cuts out this digital spectrum for every certain period of time. Herein, as an example, it is considered that the digital spectrum is cut out in units of 256-point sample, shifting by 128-point sample. For example, the speech acquisition unit 21 regards the 256-point sample as one frame, and calculates a 12-dimensional MFCC feature amount from one frame. Also, the speech acquisition unit 21 outputs 36-dimension in which MFCC feature amounts of three frames are connected. A number of frames to be connected is not limited to three, but may be a given number as long as it is equal to or greater than one. In addition, a number of samples to be cut out and the frame period are not limited to the above-described values.

Accordingly, the speech acquisition unit 21 acquires speech data including a plurality of frames, extracts a speech feature amount, and outputs the speech feature amount to the score calculation unit 22. The score calculation unit 22 passes the received speech feature amount to the keyword score calculation unit 221 and the background noise score calculation unit 222.

Calculation of keyword score and background noise score

Next, in step S102, the speech keyword detection apparatus 1 calculates $score_{KW}$ as a keyword score based on the model read from the model storing unit 31 and the above-described speech feature amount of each frame under control of the keyword score calculation unit 221.

The keyword score can be calculated as a maximum cumulative acoustic score from the start frame to the end frame including speech data, for example (see, for example, Jpn. Pat. Appln. KOKAI Publication No. 2018-155957). In the description below, a calculation method using a Hidden Markov Model (HMM) of left-to-right type and a Viterbi algorithm will be explained as an example of such a score calculation. A model may be in a GMM (Gaussian Mixture Model) or a DNN (Deep Neural Network), as described above. Herein, the model is described as a DNN of a feed forward type, and the keyword is described as "akai."

Figure 5:
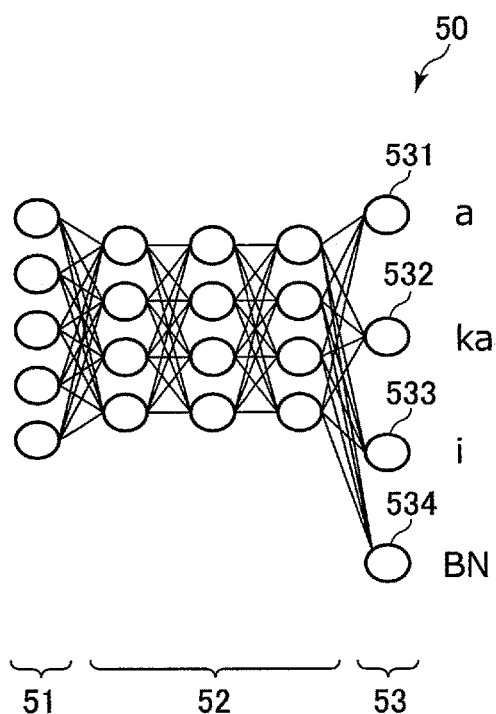
FIG. 5 is a diagram explaining a model used by the information processing apparatus according to the first embodiment.

FIG. 5 shows an image of DNN 50 as an example of such a model. The DNN 50 is previously trained with back propagation by using data for learning that includes: a pair of speech data and text data as respective correct label of the speech data, the speech data obtained by collecting a plurality of keywords spoken by a plurality of speakers; and a pair of background noise data and its correct label, the background noise data obtained by collecting background noise. The DNN 50 has an input layer 51, an intermediate layer 52, and an output layer 53. The input layer 51 of the DNN 50 has 36 nodes (not shown), and the 36-dimensional feature amount output by the speech acquisition unit 21 is input to respective nodes. Herein, the intermediate layer 52 of the DNN 50 is obtained by stacking three layers each having 256 nodes (not shown). Nodes 531 to 534 of the output layer 53 of the DNN 50 are correspondence between phonemes "a," "ka," and "i" of the keyword "akai" and a Hidden Markov Model (HMM), and correspondence between phonemes "BN" (background noise) of the background noise and the HMM, respectively. For simplicity, all of the HMMs shown in FIG. 5 are in one state. As a parameter of the HMM, transition probability between phonemes is the same at every transition, and the output probability is represented by the occurrence probability (acoustic score) of phones in each frame.

The keyword score calculation unit 221 calculates the keyword $score_{KW}$ by matching the speech data with the component of the keyword of the model as described above. In the present embodiment, first, the keyword score calculation unit 221 calculates the logarithmic likelihood of the occurrence probability of each phoneme of the keyword by using a feature amount of each frame of the speech data and the above model. Then, a path having the maximum cumulative acoustic score is specified by using the Viterbi algorithm. The keyword score calculation unit 221 calculates the maximum cumulative acoustic score from a start frame $T_s$ to an end frame $t_e$ as a keyword $score_{KW}$.

The keyword score calculation unit 221 calculates the score while incrementing $t_e$ in a time direction. At this time, the score calculation may be skipped for a few frames to reduce an amount of calculation. The maximum cumulative acoustic score is a time-series sum of a logarithmic likelihood, for example. It is also possible to use a value obtained by normalizing this sum into a specific range (e.g. 1 to 100 or 0 to 100).

In step S103, the speech keyword detection apparatus 1 calculates a background noise score relative to the background noise component of the model by using the feature amount of the same speech data as that used for calculation of the keyword score, under control of the background noise score calculation unit 222. Specifically, first, the logarithmic likelihood of the occurrence probability of phonemes of the background noise is calculated by using a feature amount of each frame of the speech data, similarly to the calculation of the keyword score. A cumulative noise score from the start frame $t_s$ to the end frame $t_e$ is calculated as a background noise, score $score_{BN}$.

Step S102 and step S103 may be performed in parallel or sequentially. The speech keyword detection apparatus 1 may calculate the keyword score and the background noise score at the same time.

Figure 6:
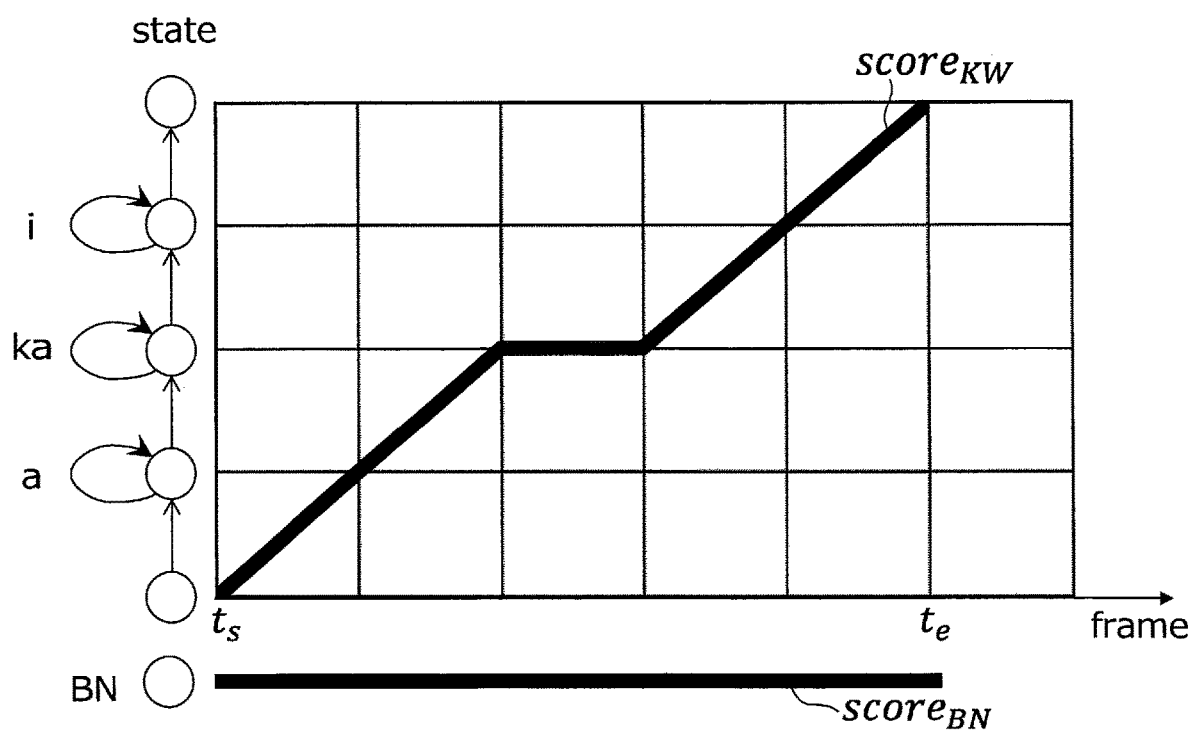
FIG. 6 is a diagram explaining score calculation performed by the information processing apparatus according to the first embodiment.

FIG. 6 is a diagram for explaining the calculation of the maximum cumulative acoustic score as described above. FIG. 6 shows a keyword space for the keyword "akai." The vertical axis represents a score of a state of each keyword, and the horizontal axis represents a frame (time). The $t_s$ is a start time of the start frame $t_s$ of a keyword on the speech data, and is hereinafter referred to as "start information." The $t_e$ is an end time of the end frame $t_e$ of a keyword on the speech data, and is hereinafter referred to as "end information." The thick line shown as score KW indicates the maximum path in the keyword space. The $score_{BN}$ as a score of background noise is also calculated for each frame, but is not plotted in the keyword space. Thus, the $score_{BN}$ is shown on the lower side.

Detection of Keyword

Next, in step S104, under control of the keyword detector 23, the speech keyword detection apparatus 1 reads the preset threshold from the threshold storing unit 32, and determines whether or not the speech data includes a keyword based on the read threshold, the keyword score calculated by the keyword score calculation unit 221, and the background noise score calculated by the background noise score calculation unit 222.

In the present embodiment, the processing proceeds to step S105 if $score_{KW}$ as the keyword score is larger than a preset keyword score threshold $\theta_{KQ}$ and $score_{BN}$ as the background noise score is smaller than a preset background noise score threshold $\theta_{BN}$ ("YES"). A keyword is less easily detected if the keyword score threshold $\theta_{KW}$ is set to be high, and a keyword is more easily detected if the keyword score threshold $\theta_{KW}$ is set to be low. The same applies to the background noise score threshold $\theta_{BN}$. If the maximum cumulative acoustic score is a value normalized into a specific range, the threshold may also be set to a value in this specific range.

In a step S105, the speech keyword detection apparatus 1 determines (detects) speech data from the start frame $t_s$ to the end frame $t_e$ that satisfies the above conditions as a keyword under control of the keyword detector 23. The start frame $t_s$ and the end frame $t_e$ are sequentially stored when calculating the cumulative score, and the speech keyword detection apparatus 1 can easily specify the section of continuous frames corresponding to a cumulative score exceeding the threshold in a keyword space as shown in FIG. 6. (See Jpn. Pat. Appln. KOKAI Publication No. 2018-155957 for details of a method for specifying the frame section in which a keyword is detected.)

If the conditions of step S104 ("NO"), the processing proceeds to step S106. In step S106, the speech keyword detection apparatus 1 determines that the speech data from the start frame $t_s$ to the end frame $t_e$ is not a keyword. Accordingly, even if the keyword $score_{KW}$ is equal to or larger than the threshold θKW, the speech data is highly likely to be background noise and is not determined as a keyword if $score_{BN}$ as the background noise score is large.

Accordingly, a keyword detector 23 can output the result of the above determination as a detection result through the input/output I/F 11 or the communication I/F 12. For example, if the speech data is determined as a keyword, the keyword detector 23 can output the keyword as a detection result. If the speech data is not determined as a keyword, the keyword detector 23 may terminate the processing, or inclement $t_e$ in the time direction to repeat the processing for the following speech data. If the process is terminated, the keyword detector 23 may generate a message indicating that a keyword is not detected and output the message.

As described above, according to the first embodiment, the speech keyword detection apparatus 1 calculates not only a keyword score but also a background noise score for each frame based on a speech feature amount. Speech data in a corresponding frame is detected as a keyword if $score_{KW}$ as a keyword score is larger than a preset keyword score threshold $\theta_{Kw}$, and $score_{BN}$ as a background noise score is smaller than a preset background noise score threshold $\theta_{BN}$.

This realizes keyword detection with a higher degree of accuracy in which false detection is suppressed compared with a case of detecting a keyword based only on a keyword score.

Second Embodiment

A speech keyword detection apparatus 1 as an information processing apparatus according to a second embodiment intends to detect a keyword with a high degree of accuracy even if the background noise is large.

The speech keyword detection apparatus 1 according to the second embodiment can adopt a system configuration and a functional configuration similar to those of the first embodiment described with reference to FIGS. 1 to 3. The speech keyword detection apparatus 1 according to the second embodiment includes a speech acquisition unit 21, a score calculation unit 22 including a keyword score calculation unit 221 and a background noise score calculation unit 222, a keyword detector 23, a model storing unit 31, and a threshold storing unit 32, similarly to the first embodiment.

Example 1

In Example 1, the speech keyword detection apparatus 1 according to the second embodiment uses a difference between the keyword score and the background noise score. In other words, the keyword detector 23 determines that the speech data includes a keyword if the difference between the keyword score and the background noise score is larger than a preset score difference threshold. Specifically, the speech data in a corresponding frame is determined as a keyword in a case where $score_{KW} - score_{BN} > \theta_D$.

Figure 7:
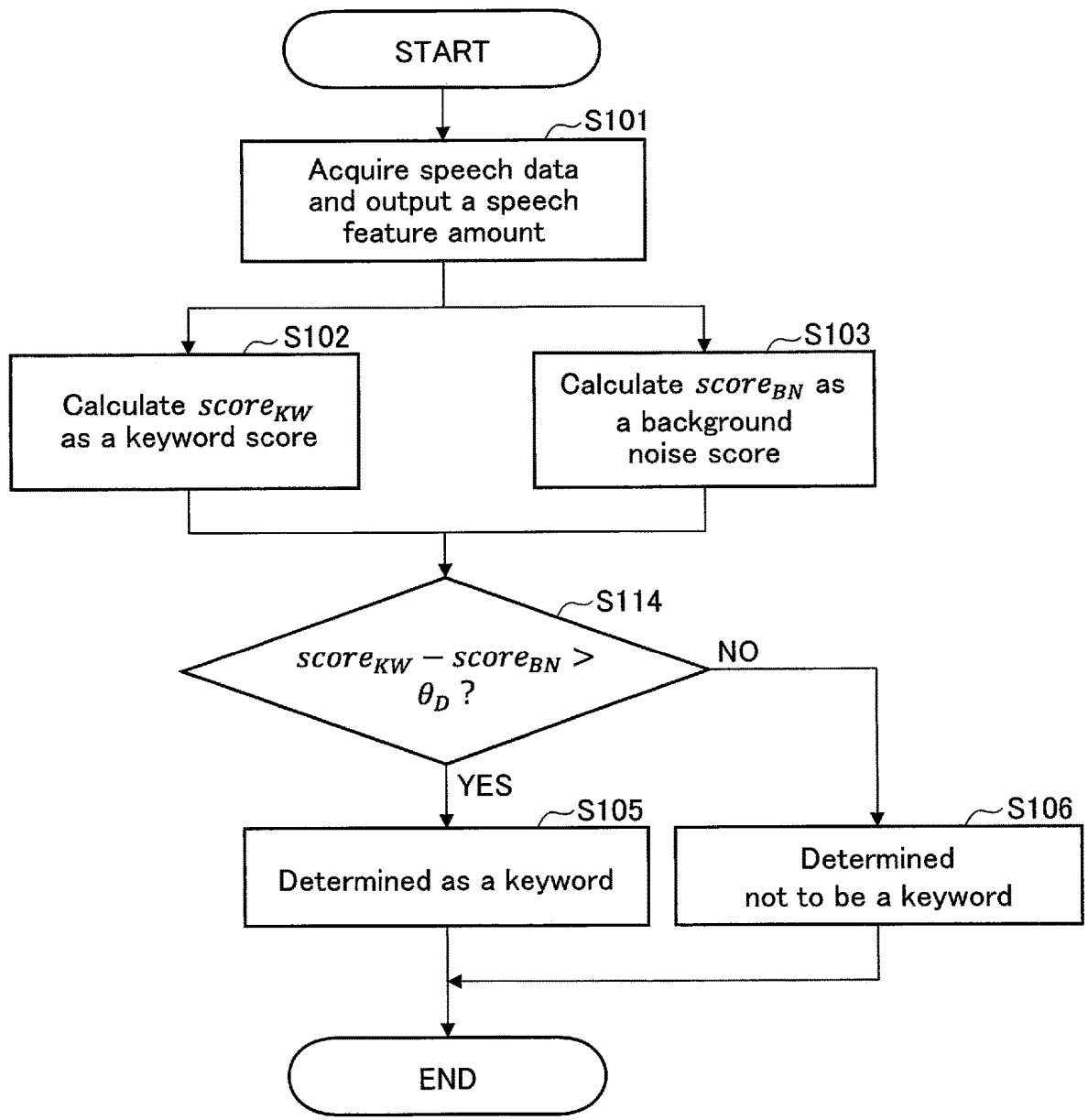
FIG. 7 is a flow chart showing a first example of a processing procedure and processing performed by an information processing apparatus according to a second embodiment.

FIG. 7 shows a first example of a processing and processing procedure of the speech keyword detection apparatus 1 according to a second embodiment. In FIG. 7, the same processing as the processing according to the first embodiment shown in FIG. 4 is referenced by the same number, and a detailed description thereof will be omitted.

First, in step S101, the speech acquisition unit 21 acquires speech data and outputs a speech feature amount.

Then, in step S102, the keyword score calculation unit 221 calculates $score_{KW}$ as a keyword score based on a speech feature amount of each frame and a keyword component of a model. In step S103, the background noise score calculation unit 222 calculates $score_{BN}$ as a background noise score based on a speech feature amount for each frame and a background noise component of a model.

In step S114, in a different manner from step S104 in FIG. 4, the keyword detector 23 calculates a difference between the calculated $score_{KW}$ as the keyword score and the calculated $score_{BN}$ as the background noise score, and compares the difference with a score difference threshold $\theta_D$ read from the threshold storing unit 32. If the calculated difference is larger than the score difference threshold $\theta_D$ ("YES"), the speech data is determined as a keyword (S105), and if the calculated difference is equal to or smaller than the score difference threshold $\theta_D$("NO"), it is determined that the speech data is not a keyword (S106).

Example 2

In Example 2, the speech keyword detection apparatus 1 according to the second embodiment uses a ratio between a keyword score and a background noise score. In other words, if the ratio between a keyword score and a background noise score is larger than a preset score ratio threshold, the keyword detector 23 determines that speech data includes a keyword. Specifically, in a case of $score_{KW}/score_{BN} > \theta_R$, speech data according to the corresponding frame is determined as a keyword.

Figure 8:
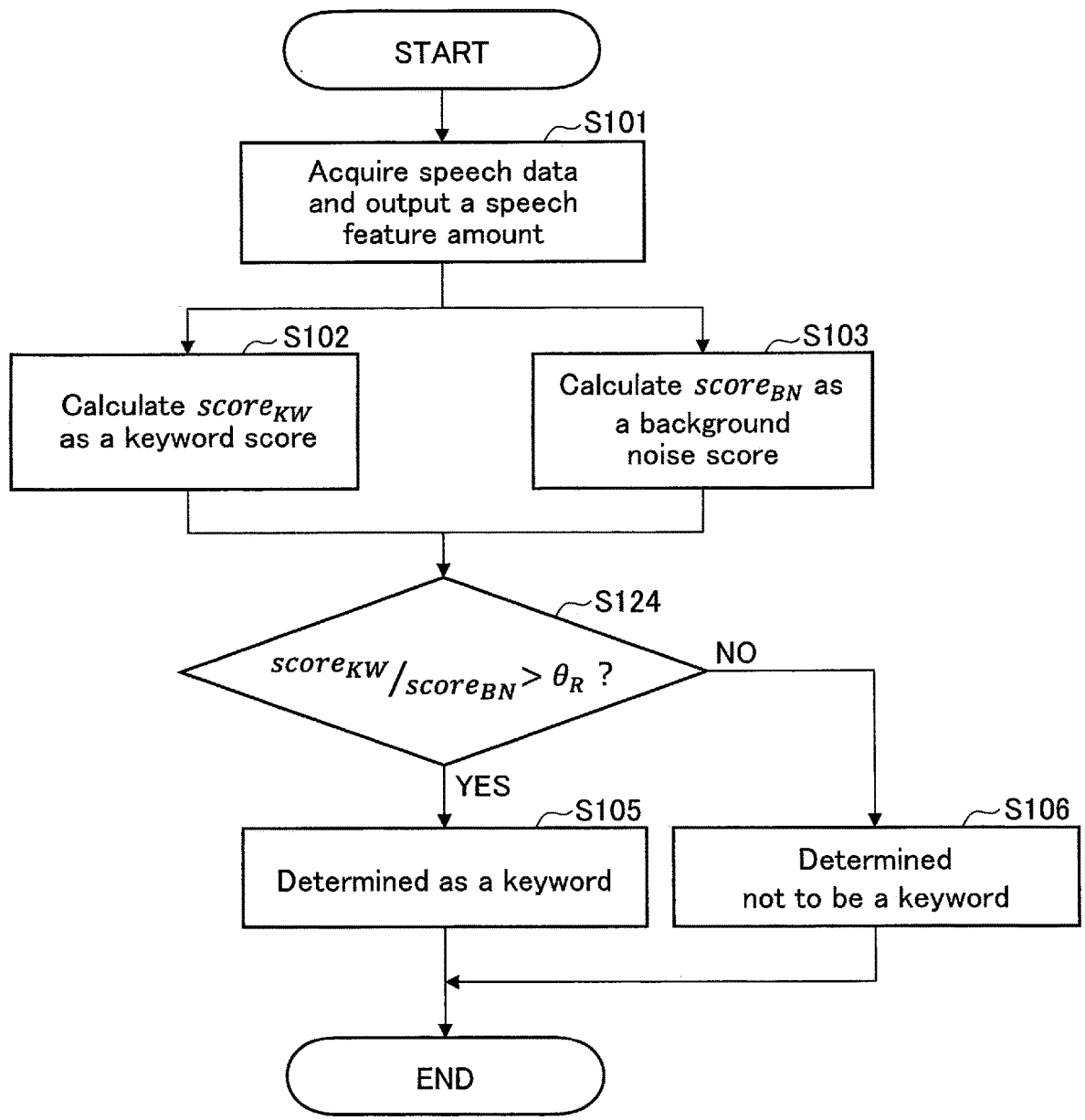
FIG. 8 is a flow chart showing a second example of a processing procedure and processing performed by the information processing apparatus according to the second embodiment.

FIG. 8 indicates processing and a processing procedure of the keyword detection apparatus 1 according to Example 2 of the second embodiment. In FIG. 8, the same processing as the processing according to the first embodiment shown in FIG. 4 is referenced by the same number, and a detailed description thereof will be omitted.

First, in step S101, the speech acquisition unit 21 acquires speech data and outputs a speech feature amount. Then, in step S102, the keyword score calculation unit 221 calculates $score_{KW}$ as a keyword score based on a speech feature amount of each frame and a keyword component of a model. In step S103, the background noise score calculation unit 222 calculates $score_{BN}$ as a background noise score based on a speech feature amount of each frame and a background noise component of a model.

Next, in step S124, in a different manner from step S104 in FIG. 4, the keyword detector 23 calculates a ratio between the calculated $score_{KW}$ as a keyword score and calculated $score_{BN}$ as the background noise score, and compares the ratio with a score ratio threshold $\theta_R$ read from the threshold storing unit 32. If the calculated ratio is larger than the score ratio threshold $\theta_R$ ("YES"), the speech data is determined as a keyword (S105), and if the calculated ratio is equal to or smaller than the score ratio threshold $\theta_R$ ("NO"), it is determined that the speech data is not a keyword (S106).

In both Example 1 and Example 2 of the second embodiment, the keyword detector 23 can output a detection result similarly to the first embodiment. For example, if the speech data is determined to include a keyword, the keyword detector 23 can output the keyword as a detection result.

The speech keyword detection apparatus 1 according to the second embodiment calculates a keyword score and a background noise score, compares a difference or ratio between them with a preset threshold, and determines whether or not the speech data includes a keyword in accordance with the comparison result.

If the background noise is large, the calculated background noise score is large; thus, in practice, there may be a case where a keyword is not detected even if speech data includes a keyword. However, according to the second embodiment, even if background noise is large and the background noise score is large, it is possible to detect a keyword as long as the keyword score is sufficiently larger than the background noise score. Accordingly, compared with a case of evaluating only a keyword score, false detection of background noise as a keyword is reduced, and detection accuracy of a keyword is improved.

Third Embodiment

A speech keyword detection apparatus 1 as an information processing apparatus according to a third embodiment intends to detect a keyword with high accuracy while reducing an amount of calculation.

The speech keyword detection apparatus 1 according to the third embodiment can adopt a system configuration and a functional configuration similar to those of the first embodiment described with reference to FIGS. 1 to 3. The speech keyword detection apparatus 1 according to the third embodiment includes a speech acquisition unit 21, a score calculation unit 22 including a keyword score calculation unit 221 and a background noise score calculation unit 222, a keyword detector 23, a model storing unit 31, and a threshold storing unit 32, similarly to the first embodiment. Processing takes place in different directions to the arrows shown in FIG. 3.

Example 1

The speech keyword detection apparatus 1 according to the third embodiment first detects a keyword candidate based on a keyword score. If a keyword candidate is detected, the speech keyword detection apparatus 1 calculates a background noise score for a frame of the keyword candidate, and determines whether or not speech data is a keyword by using the background noise score.

In other words, in a different manner from the first and second embodiment, the keyword detector 23 compares a keyword score and a keyword score threshold calculated by the keyword score calculation unit 221, and determines whether or not speech data is a keyword candidate which may be a keyword. If a keyword candidate is detected, the background noise score calculation unit 222 calculates a background noise score by using start information and end information of the keyword candidate.

Specifically, if $score_{KW}$ as the keyword score is larger than a keyword score threshold $\theta_{KW}$, the keyword detector 23 determines that the speech data includes a keyword candidate. Then, the background noise score calculation unit 222 calculates $score_{BN}$ as a background noise score by using the start frame $t_s$ and the end frame $t_e$ of the keyword candidate.

Next, the keyword detector 23 compares the magnitudes of $score_{BN}$ as a background noise score and a background noise score threshold $\theta_{BN}$ to determine whether or not the speech data is a keyword. Specifically, if $score_{BN}$ as a background noise score is smaller than a preset background noise score threshold $\theta_{BN}$, the keyword detector 23 determines (detects) speech data between the start frame $t_s$ and the end frame $t_e$ of the keyword candidate as a keyword.

Figure 9:
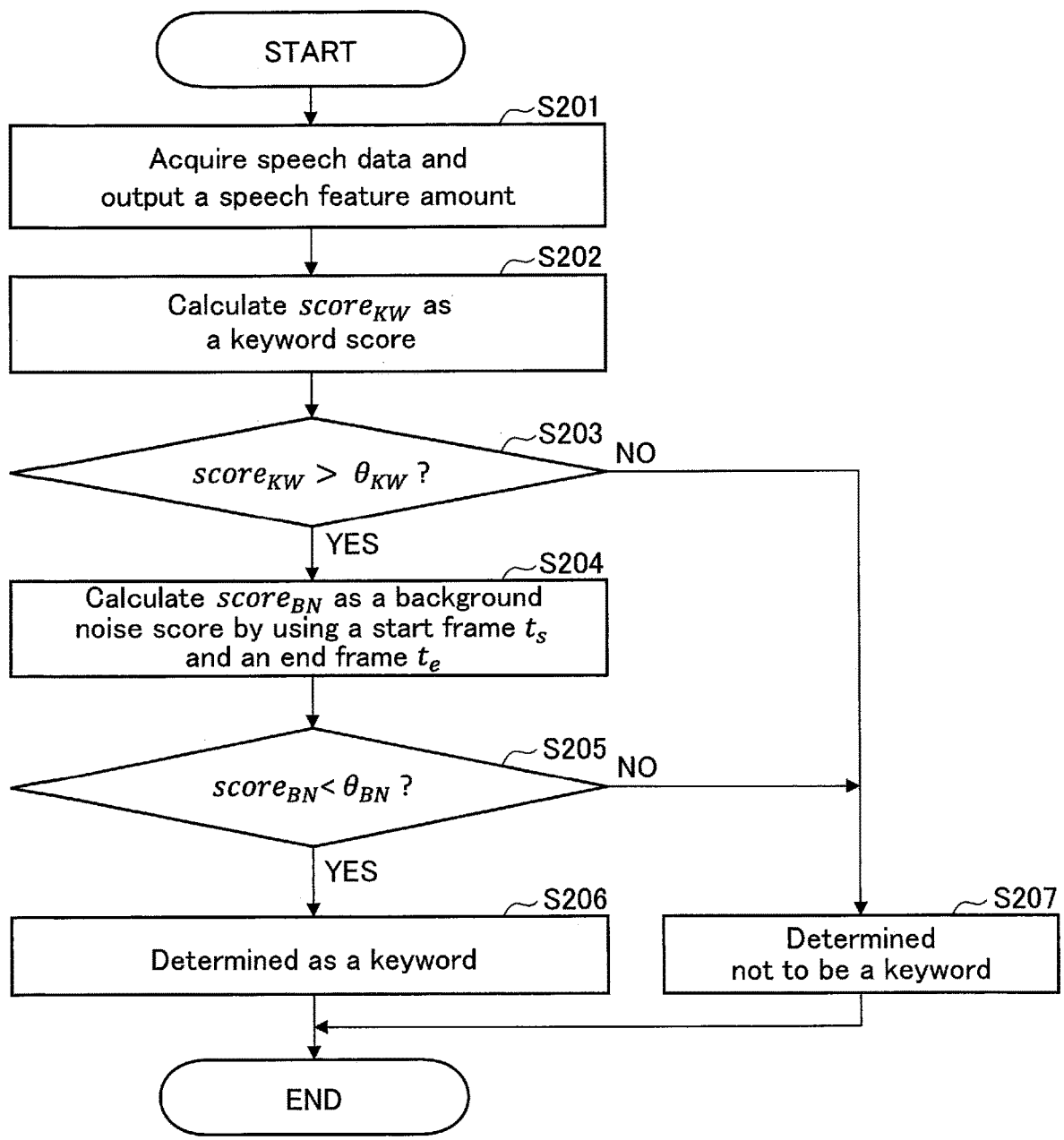
FIG. 9 is a flow chart showing a first example of a processing procedure and processing performed by an information processing apparatus according to the third embodiment.

FIG. 9 shows a first example of a processing and processing procedure of the speech keyword detection apparatus 1 according to a third embodiment. A detailed description of the same processing as the processing according to the first embodiment described with reference to FIG. 4 will be omitted.

First, in step S201, the speech keyword detection apparatus 1 acquires speech data and outputs a speech feature amount, under control of the speech acquisition unit 21, similarly to the first embodiment.

Next, in step S202, the speech keyword detection apparatus 1 calculates $score_{KW}$ as a keyword score under control of the keyword score calculation unit 221, similarly to the first embodiment.

In step S203, the speech keyword detection apparatus 1 reads a keyword score threshold $\theta_{KW}$ from the threshold storing unit 32, and determines whether or not a keyword $score_{KW}$ calculated by the keyword score calculation unit 221 is larger than a keyword score threshold $\theta_{KW}$, under control of the keyword detector 23. If the keyword $score_{KW}$ is equal to or smaller than the keyword score threshold ("NO"), the processing proceeds to step S207, and it is determined that the speech data is not a keyword. On the other hand, if the keyword $score_{KW}$ is larger than the keyword score threshold ("YES"), the speech data is determined as a keyword candidate, and the processing proceeds to step S204.

Next, in step S204, the speech keyword detection apparatus 1 calculates $score_{BN}$ as a background noise score of a section corresponding to the keyword candidate by using the information on the start frame $t_s$ and the end frame $t_e$ of the keyword candidate under control of the background noise score calculation unit 222, and passes the $score_{BN}$ as the calculated background noise score to the keyword detector 23.

In step S205, the speech keyword detection apparatus 1 reads a background noise score threshold $\theta_{BN}$ from the threshold storing unit 32, and determines whether or not the calculated $score_{BN}$ as the background noise score is smaller than the background noise score threshold $\theta_{BN}$, under control of the keyword detector 23. If $score_{BN}$ as the background noise score is smaller than the background noise score threshold ("YES"), the processing proceeds to step S206, and the speech data is determined as a keyword. If $score_{BN}$ as the background noise score is equal to or more than the background noise score threshold ("NO"), the processing proceeds to step S207 and it is determined that the speech data is not a keyword.

Example 2

In Example 2, if a keyword candidate is detected, the speech keyword detection apparatus 1 according to the third embodiment calculates a background noise score, and determines whether or not the keyword candidate is a keyword by using the difference between a keyword score and a background noise score.

In other words, similarly to the above Example 1, the keyword detector 23 compares the keyword score and the keyword score threshold calculated by the keyword score calculation unit 221, and determines whether or not the speech data is a keyword candidate which may be a keyword. If a keyword candidate is detected, the background noise score calculation unit 222 calculates a background noise score by using start information and end information of the keyword candidate.

Then, the keyword detector 23 calculates the difference between the keyword score and the background noise score, and compares magnitudes of the difference and a preset score difference threshold to determine whether or not the speech data is a keyword. Specifically, similarly to Example 1 of the second embodiment, the speech data between the start frame $t_s$ and the end frame $t_e$ of the keyword candidate is determined (detected) as a keyword in a case where $score_{KW} - score_{BN} > \theta_D$.

Figure 10:
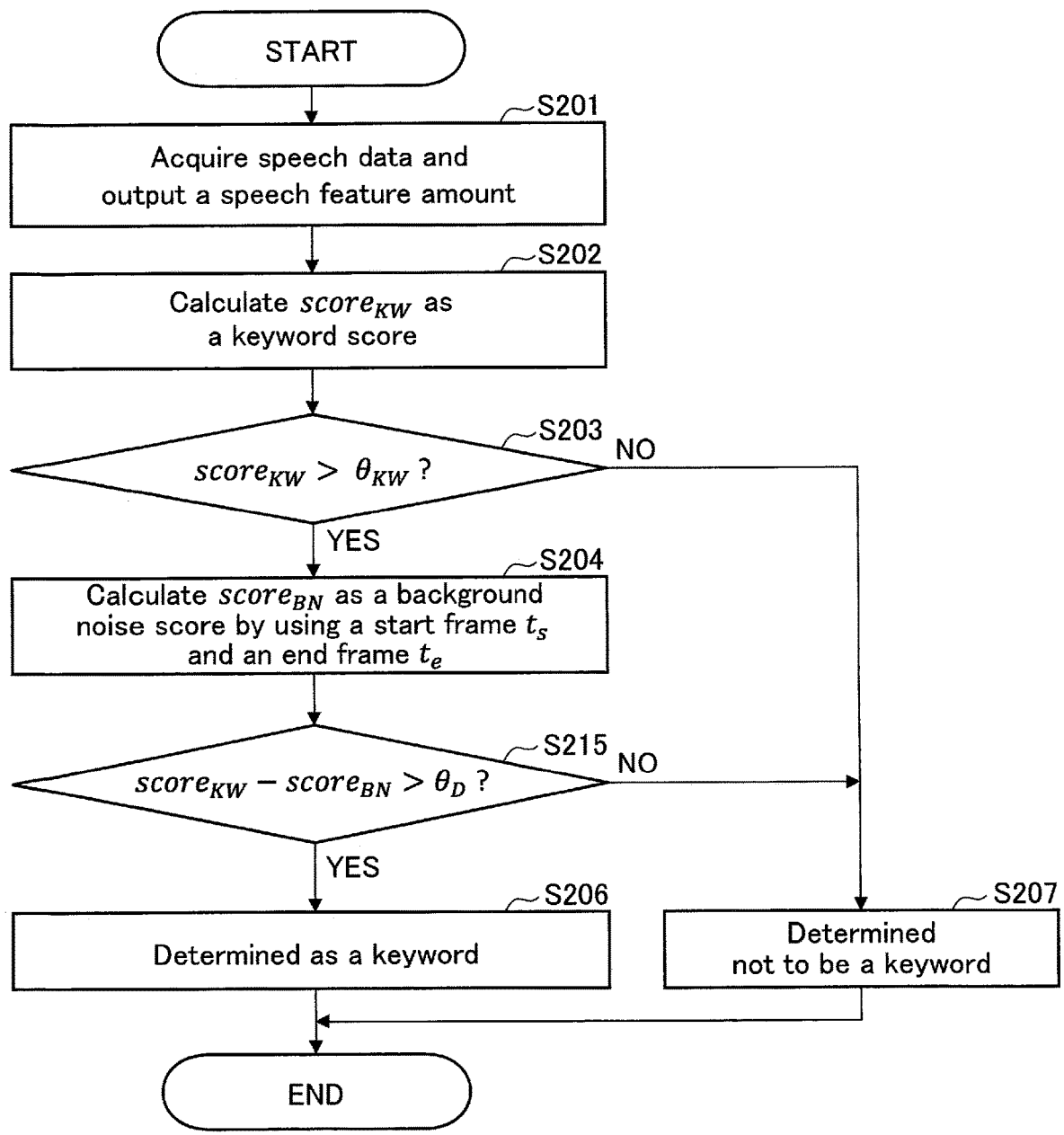
FIG. 10 is a flow chart showing a second example of a processing procedure and processing performed by the information processing apparatus according to the third embodiment.

FIG. 10 shows processing and a processing procedure of the keyword detection apparatus 1 according to Example 2 of the third embodiment. In FIG. 10, the same processing as that according to Example 1 of the third embodiment shown in FIG. 9 is referenced by the same number, and a detailed description thereof will be omitted.

First, in step S201, the speech acquisition unit 21 acquires speech data and outputs a speech feature amount. Then, in step S202, the keyword score calculation unit 221 calculates $score_{KW}$ as a keyword score based on a speech feature amount of each frame and a keyword component of a model.

In step S203, the keyword detector 23 reads a keyword score threshold $\theta_{KW}$ from the threshold storing unit 32, and determines whether or not $score_{KW}$ as the keyword score calculated by the keyword score calculation unit 221 is larger than the keyword score threshold $\theta_{KW}$. If $score_{KW}$ as the keyword score is equal to or smaller than the keyword score threshold ("NO"), the processing proceeds with step S207, and it is determined that the speech data is not a keyword. On the other hand, if $score_{KW}$ as the keyword score is larger than the keyword score threshold ("YES"), the speech data is determined as a keyword candidate, and the processing proceeds with step S204.

In step S204, the background noise score calculation unit 222 calculates $score_{BN}$ as a background noise score of a section corresponding to the keyword candidate.

Next, in step S215, in a different manner from step S205 in FIG. 9, the keyword detector 23 calculates a difference between the calculated $score_{KW}$ as the keyword score and the calculated $score_{BN}$ as the background noise score, and compares the difference with a score difference threshold $\theta_D$ read from the threshold storing unit 32. If the calculated difference is larger than the score difference threshold $\theta_D$ ("YES"), the speech data is determined as a keyword (S206), and if the calculated 0.5 difference is equal to or smaller than the score difference threshold $\theta_D$ ("NO"), it is determined that the speech data is not a keyword (S207).

Example 3

In Example 3, if a keyword candidate is detected, the speech keyword detection apparatus 1 according to the third embodiment calculates a background noise score, and determines whether or not the speech data is a keyword by using a ratio between a keyword score and a background noise score.

In other words, similarly to the above Examples 1 and 2, the keyword detector 23 compares a keyword score and a keyword score threshold calculated by the keyword score calculation unit 221, and determines whether or not speech data is a keyword candidate which may be a keyword. If a keyword candidate is detected, the background noise score calculation unit 222 calculates a background noise score by using start information and end information of the keyword candidate.

The keyword detector 23 calculates a ratio between the keyword score and the background noise score, and compares magnitudes of the ratio and a preset score ratio threshold to determine whether or not the speech data is a keyword. Specifically, similarly to the description in Example 2 of the second embodiment, the speech data between the start frame $t_s$ and the end frame $t_e$ of the keyword candidate is determined (detected) as a keyword in a case where $score_{KW}-score_{BN}>\theta_R$.

Figure 11:
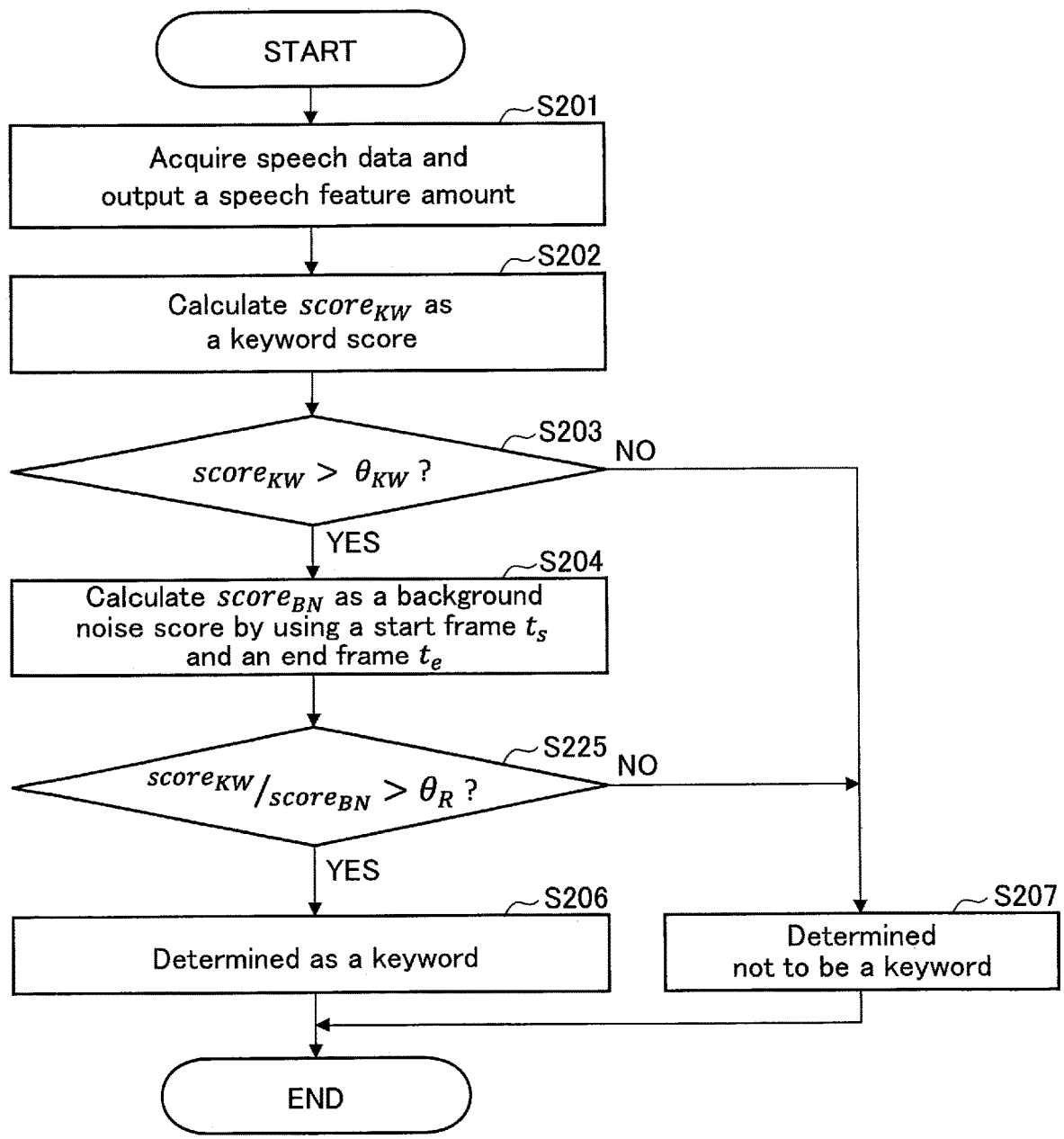
FIG. 11 is a flow chart showing a third example of a processing procedure and processing performed by the information processing apparatus according to the third embodiment.

FIG. 11 indicates processing and a processing procedure of the keyword detection apparatus 1 according to Example 3 of the third embodiment. In FIG. 11, the same processing as the processing according to Example 1 of the third embodiment shown in FIG. 9 is referenced by the same number, and a detailed description thereof will be omitted.

First, in step S201, the speech acquisition unit 21 acquires speech data and outputs a speech feature amount. Then, in step S202, the keyword score calculation unit 221 calculates $score_{KW}$ as a keyword score based on a speech feature amount of each frame and a keyword component of a model. In step S203, the keyword detector 23 reads a keyword score threshold $\theta_{KW}$ from the threshold storing unit 32, and determines whether or not $score_{KW}$ as the keyword score calculated by the keyword score calculation unit 221 is larger than the keyword score threshold $\theta_{KW}$. If the keyword score is equal to or smaller than the keyword score threshold ("NO"), the processing proceeds with step S207, and it is determined that the speech data is not a keyword. On the other hand, if the keyword score is larger than the keyword score threshold ("YES"), the speech data is determined as a keyword candidate, and the processing proceeds with step S204. In step S204, the background noise score calculation unit 222 calculates $score_{BN}$ as a background noise score of a section corresponding to the keyword candidate.

Next, in step S225, in a different manner from step S205 in FIG. 9, the keyword detector 23 calculates a ratio between the calculated $score_{KW}$ as the keyword score and the calculated score as the background noise score, and compares the ratio with a score ratio threshold $\theta_R$ read from the threshold storing unit 32. If the calculated ratio is larger than the score ratio threshold $\theta_R$ ("YES"), the speech data is determined as a keyword (S206), and if the calculated ratio is equal to or smaller than the score ratio threshold $\theta_R$ ("NO"), it is determined that the speech data is not a keyword (S207).

In all of Examples 1 to 3 of the third embodiment, the keyword detector 23 can output a detection result similarly to the first and second embodiments. For example, if the speech data is determined to include a keyword, the keyword detector 23 can output the keyword as a detection result.

The speech keyword detection apparatus 1 according to the third embodiment, it is first determined whether or not speech data is a keyword candidate based on a keyword score and a keyword score threshold. If speech data is determined as a keyword candidate, a background noise score is calculated for a frame of the keyword candidate. Moreover, the speech keyword detection apparatus 1 further determines whether or not the frame of the keyword candidate is a keyword based at least on the background noise score and a preset threshold.

As described above, according to the third embodiment, a background noise score is not calculated for all speech data, but is calculated if speech data is highly likely a keyword; thus, it is possible to reduce an amount of calculation while reducing false detection of background noise as a keyword.

According to information processing apparatus and information processing method of at least one embodiment described above, it is possible to provide a technique for detecting a keyword from speech with a high degree of accuracy.

Other Embodiments

The present invention is not limited to the above embodiments. For example, in the above embodiments, background noise is treated as an element (phoneme); however, it is also possible to create and train a model in which background noise includes a plurality of types. For example, in a running car, steady noise including engine noise may emanate in addition to noise caused by people on the car. In a conference room, steady noise from a fan and a motor of an air conditioner in operation may emanate in addition to noises related to the opening and closing of a door and conversation in an adjacent room. Accordingly, background noise may be divided into such steady noise and the other unsteady noise, and a background noise score may be calculated for respective types of noise. At this time, different thresholds may be set for a plurality of types of background noise; for example, a threshold may be strictly set for steady noise. This enables steady noise (for example, the engine noise of a car or an airplane, and the motor noise of a refrigerator and an air conditioner) to be distinguished from conversation in an adjacent room and activity noise of people, which is expected to improve accuracy.

A model for calculating a maximum cumulative acoustic score is not limited to a model in units of phoneme. For example, a model may be generated in units of vocal sound, mora, phonetic representation, or notation character. A method of calculating a cumulative score is not limited to a method using HMM and Viterbi algorithm, and it is also possible to apply a method of calculation based on a neural network having a recurrent structure such as a combination of LSTM (long short-term memory) and CTC (connectionist temporal classification), or a method of calculation using an attention model. For acoustic score calculation in frame units, not only a neural network of a feedforward type but also a neural network having a recurrent structure (e.g. LSTM) may be applied.

It is also possible to perform processing by arranging the function parts included in the described speech keyword detection apparatus 1, regarding the above embodiments, in a plurality of devices (e.g. a server, an edge server, and other client terminals) in a dispersed manner, and coordinating these devices. Each function part may be implemented by the use of a circuit. The circuit may be a dedicated circuit for implementing a specific function, or a universal circuit such as a processor.

The procedure of each processing described above is not limited to the described order, but some steps may switch the order, or some steps may be performed concurrently. It is not necessary to perform the sequence of the above processing in a temporally-sequential manner, but each step may be performed at a given timing.

The processing of each of the above embodiments is at least partially feasible with, for example, the use of a processor installed in a general-purpose computer as a basic hardware. A program for implementing the above processing may be provided in such a manner that the program is stored in a computer-readable recording medium (a storage medium). The program is stored in the recording medium as a file in an installable format, or as a file in an implementable format. A recording medium may be, for example, a magnetic disk, an optical disk (CD-ROM, CD-R, DVD, etc.), a magnet-optical disk (MO, etc.), and a semiconductor memory. A recording medium may be any of the above media as long as it can store a program and is computer-readable. In addition, a program for implementing the above processing may be stored on a computer (server) connected to a network such as the Internet, and may be downloaded into a computer (client) through the network.

Other than the above, various modifications of the obtainment of speech data and the generation of a model may be carried out without departing from the spirit of the present invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a first acquisition processor configured to acquire speech data including a plurality of frames;
a second acquisition processor configured to acquire a model trained to, upon input of a feature amount extracted from the speech data, output information indicative of likelihood of each of a plurality of classes including a component of a keyword and a component of background noise other than the keyword, the keyword including speech, the background noise including non-speech, the keyword and the background noise not including silence, the background noise being divided into two types of noise which are steady background noise and unsteady background noise;
a first calculation processor configured to calculate a keyword score indicative of occurrence probability of the component of the keyword, based on the information output from the model, by extracting the feature amount for each of the frames of the speech data and inputting the feature amount to the model;
a second calculation processor configured to determine whether or not the speech data includes a candidate for the keyword based on the keyword score and a first threshold, and if the speech data is determined to include the candidate for the keyword, calculate a steady background noise score indicative of occurrence probability of the component of the steady background noise and an unsteady background noise score indicative of occurrence probability of the component of the unsteady background noise, based on the information output from the model, by extracting the feature amount for each of the frames corresponding to the candidate for the keyword and inputting the feature amount to the model; and a determination processor configured to determine whether or not the speech data includes the keyword based on a first relation indicating whether or not the steady background noise score is smaller than a second threshold and a second relation indicating whether or not the unsteady background noise score is smaller than a third threshold, the second threshold being set for the steady background noise and stricter than the third threshold set for the unsteady background noise.

2. The apparatus according to claim 1 wherein the information includes correspondence between a phoneme as the component of the keyword and a first Hidden Markov Model, and correspondence between a phoneme as the component of the background noise and a second Hidden Markov Model.

3. The apparatus according to claim 1, wherein in calculating the keyword score, the first calculation processor calculates occurrence probability of correspondence between a phoneme as the component of the keyword and a Hidden Markov Model, and calculates a cumulative value of the occurrence probability of the correspondence by using Viterbi algorithm.

4. The apparatus according to claim 1, wherein if the keyword score is larger than a first threshold and the steady background noise score is smaller than the second threshold, the determination processor determines that the speech data includes the keyword.

5. The apparatus according to claim 1, wherein if a difference between the keyword score and the steady background noise score is larger than a fourth threshold, the determination processor determines that the speech data includes the keyword.

6. The apparatus according to claim 1, wherein if a ratio between the keyword score and the steady background noise score is larger than a fifth threshold, the determination processor determines that the speech data includes the keyword.

7. The apparatus according to claim 1, wherein
if the keyword score is larger than the first threshold, the second calculation processor determines that the speech data includes the candidate for the keyword, and calculates the steady background noise score for the frames corresponding to the candidate for the keyword by using start information and end information of the candidate for the keyword, and
if the steady background noise score is smaller than the second threshold, the determination processor determines that the speech data includes the keyword.

8. The apparatus according to claim 1, wherein
if the keyword score is larger than the first threshold, the second calculation processor determines that the speech data includes the candidate for the keyword, and calculates the steady background noise score for the frames corresponding to the candidate for the keyword by using start information and end information of the candidate for the keyword, and
if a difference between the keyword score and the steady background noise score is larger than a fourth threshold, the determination processor determines that the speech data includes the keyword.

9. The apparatus according to claim 1, wherein
if the keyword score is larger than the first threshold, the second calculation processor determines that the speech data includes the candidate for the keyword, and calculates the steady background noise score for the frames corresponding to the candidate for the keyword by using start information and end information of the candidate for the keyword, and if a ratio between the keyword score and the steady background noise score is larger than a fifth threshold, the determination processor determines that the speech data includes the keyword.

10. The apparatus according to claim 1, wherein the classes include a plurality of components of the steady background noise and a plurality of components of the unsteady background noise, and the second calculation processor calculates the steady background noise score for each of the plurality of components of the steady background noise in each of the frames and the unsteady background noise score for each of the plurality of components of the unsteady background noise in each of the frames.

11. The apparatus according to claim 1, wherein the background noise includes speech.

12. An information processing method, performed by an information processing apparatus, the method comprising:

acquiring speech data including a first frame;

acquiring a model trained to, upon input of a feature amount extracted from the speech data, output information indicative of likelihood of each of a plurality of classes including a component of a keyword and a component of background noise other than the keyword, the keyword including speech, the background noise including non-speech, the keyword and the background noise not including silence, the background noise being divided into two types of noise which are steady background noise and unsteady background noise;

calculating a keyword score indicative of occurrence probability of the component of the keyword, based on the information output from the model, by extracting the feature amount for the first frame of the speech data and inputting the feature amount to the model;

determining whether or not the speech data includes a candidate for the keyword based on the keyword score and a first threshold, and if the speech data is determined to include the candidate for the keyword, calculating a steady background noise score indicative of occurrence probability of the component of the steady background noise and an unsteady background noise score indicative of occurrence probability of the component of the unsteady background noise, based on the information output from the model, by extracting the feature amount for the first frame of the speech data and inputting the feature amount to the model; and determining whether or not the speech data includes the keyword based on a first relation indicating whether or not the steady background noise score is smaller than a second threshold and a second relation indicating whether or not the unsteady background noise score is smaller than a third threshold, the second threshold being set for the steady background noise and stricter than the third threshold set for the unsteady background noise.

13. The method according to claim 12, wherein the background noise includes speech.

* * * * *